H. W. PLEISTER.
CONDUIT OR CABLE CLAMP AND BRIDLE RING.
APPLICATION FILED DEC. 24, 1920.

1,381,239.  Patented June 14, 1921.

INVENTOR
Henry W. Pleister
BY
Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, EXECUTOR OF HENRY B. NEWHALL, SR., DECEASED.

CONDUIT OR CABLE CLAMP AND BRIDLE-RING.

1,381,239. Specification of Letters Patent. Patented June 14, 1921.

Application filed December 24, 1920. Serial No. 432,973.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with integral means to space the head of the securing screw from the base to permit a bridle ring to be hooked under, and be secured by, the head of the securing screw, without loosening or tightening the screw to attach or detach the bridle ring.

My invention further relates to such a conduit or cable clamp having a hollow struck up boss of less diameter than the head of the securing screw to be employed with the clamp.

My invention further relates to such a conduit or cable clamp having means to coöperate with the shank of a bridle ring and prevent its accidental or unauthorized swinging or pivoting on the boss after the bridle ring is mounted.

My invention further relates to such a conduit or cable clamp having means to hold the shank of the bridle ring under spring tension after it is brought into its operative position on the clamp.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

Figure 1:
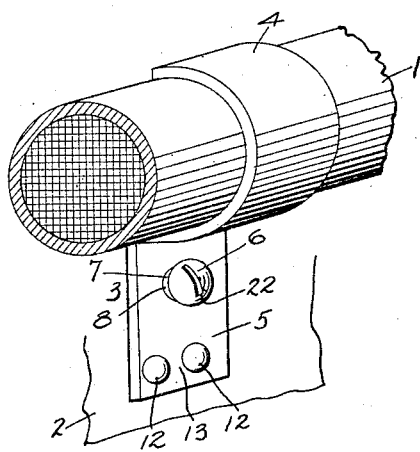
Figure 1 is a perspective view of my conduit or cable clamp and of a cable which it supports.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the need of the service demands it, my bridle ring may be supported by the same conduit or cable clamp, when the complete combination would be used.

In my invention the cable 1 is supported on a wall or other suitable support 2 by means of the conduit or cable clamp 3, having a hook portion 4, and a base 5. The clamp is held to the wall or other support 2 by means of a securing screw having a head 6.

By my invention I firmly secure the base 5 of the conduit or cable clamp to the support 2 yet leave a space between the head 6 of the securing screw and the surface of the base 5. This space forms a channel 7, in which I hook a bridle ring without operating the securing screw, either to loosen or tighten it. It is well known that when screws are screwed into a support, then loosened, and a member inserted under the head of the screw, which is again tightened to clamp the member, the fastening is not as secure as it was originally for the screw cannot again fill the female threads in the support or penetrate as far as it did originally.

Figure 2:
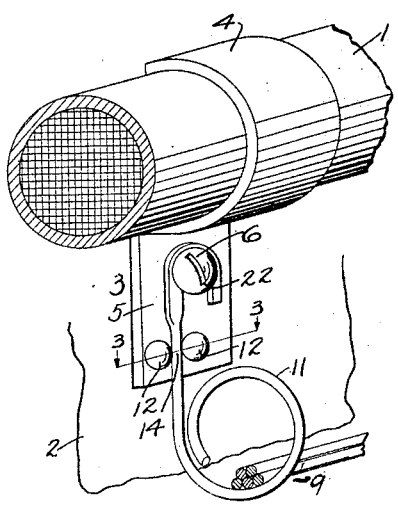
Fig. 2 is a perspective view of the conduit or cable clamp shown in Fig. 1 with the addition of my bridle ring, and runs of bridle wires supported by the bridle ring.

In first installing the cable 1 the screw is screwed through the hollow boss 8, which is preferably struck up from the base 5, so that the screw head 6 presses firmly on the end of the hollow boss 8. After the screw is once positioned the fastening is never weakened by again operating the screw to clamp anything under its head. Weeks, months or years later, when the telephone or telegraph engineers may determine that it is advisable to increase the capacity of the installation by stringing runs of bridle wires 9, 9, this can be readily done, without turning the head 6 of the securing screw, by simply hooking the hook 10 of the bridle ring 11 over the boss 8 back of the head 6 of the screw. The bridle ring can be readily attached by bringing it into a horizontal position as shown in Fig. 2 of my companion application, Ser. No. 424,472.

In swinging the bridle ring 11 down into its vertical position, after it is engaged behind the head 6 of the screw and over the boss 8, it has more or less pivoted movement on the boss. In my invention this is prevented by means mounted on the base to stop this rocking or pivoted movement. This insures that when the bridle ring is once positioned it will not accidentally be moved by wind or other pressure on the bridle wires to accidentally disengage the bridle ring from the conduit or cable clamp.

Figure 3:
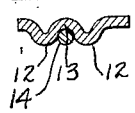
Fig. 3 is a horizontal section on the line 3—3 of Fig. 2, looking in the direction of the arrows.
Figure 4:
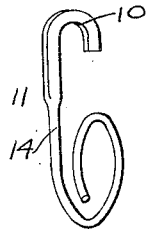
Fig. 4 is a perspective view of my preferred form of bridle ring.

I may employ various means to accomplish this result. I have shown for example in Figs. 1, 2 and 3 lugs or tits 12, 12 struck up from the base leaving a valley 13 between them. In positioning the bridle ring, whatever its form may be, after hooking the hook 10 over the boss 8 and behind the head 6 of the screw, the shank 14 of the bridle ring is swung down and forced over one of the lugs or tits 12, the shank coming to rest in the valley 13. These lugs or tits 12, 12 act as stops or locks and prevent the bridle ring swinging or pivoting upon the boss 8, due to wind or other pressure on the runs of bridle wires 9, 9.

Figure 5:
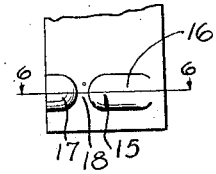
Fig. 5 is a fragmentary detail plan view of a modification, in which different forms of lugs or tits may be employed.
Figure 6:
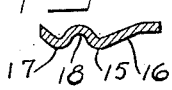
Fig. 6 is a vertical section on line 6—6 of Fig. 5, looking in the direction of the arrows.

I may also form these lugs or tits as shown in Figs. 5 and 6 in which the lug or tit 15 has a long inclined or wedged surface 16. Between it and the lug or tit 17 is an interposed valley 18. The valley 18 lies substantially in the same plane as the outer or exposed surface of the base 5; that is, it is not raised substantially above the plane of the base.

Figure 7:
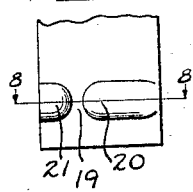
Fig. 7 is a fragmentary detail plan view of a still further modification in which the valley between the lugs or tits is raised above the level of the base so as to hold the bridle ring under spring tension.
Figure 9:
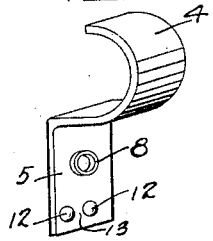
Fig. 9 is a perspective view of the conduit or cable clamp shown in Fig. 1.
Figure 8:
Fig. 8 is a detail vertical section on the line 8—8 of Fig. 7, looking in the direction of the arrows.

In some cases I may desire to arrange the lugs, tits and valley so that the bridle ring will remain under spring tension as long as it is connected to the conduit or cable clamp. This makes a very firm lock. I have shown such a construction in Figs. 7 and 8 in which the valley 19 is raised above the plane of the surface of the base 5 so that when the shank 14 is pressed over the lug or tit 20 it will become seated in the valley 19 lying between that lug or tit and the corresponding lug or tit 21. This will cause the shank 14 to remain under spring tension, due to the fact that the hook 10 of the bridle ring is engaged behind the head 6 of the screw and the shank 14 is held out or away from the plane of the base 5, the valley 19 being, as previously described raised above the plane of the base 5 to insure this action.

My boss 8 may be located in any suitable position on the base 5. It is preferably, however, located adjacent to the under surface of the hook 4, so that this hook acts as a lock or stop to prevent the bridle hook 10 being disengaged from the channel 7 by a vertical movement. When the boss is so located no amount of vibration of the bridle wires 9, 9 can cause the hook 10 of the bridle ring to move vertically a sufficient distance to cause it to become disengaged from the channel 7.

In my invention it is immaterial whether the screw has rusted in its support 2 or whether or not the slot 22 in the head of the screw 6 has rusted to such an extent as to interfere with the ready insertion and manipulation of a screw driver, for no screw driver or other tool is employed to attach the bridle ring to the conduit or cable clamp.

Having thus described this invention in connection with illustrative embodiments thereof, to the details of which I do not desire to be limited, what is claimed as new and what is desired to secure by Letters Patent is set forth in the appended claims.

What I claim is:—

1. A conduit or cable clamp provided with a hook portion and a base having a hole for a securing screw, means to prevent the head of the securing screw contacting with the surface of the base, said means being of less diameter than the head of the securing screw, and means on the base to prevent the accidental or unauthorized swinging of a bridle ring with relation to the conduit or cable clamp.

2. A conduit or cable clamp provided with a hook portion and a base having a hollow boss struck up from the base, the opening in the boss adapted to receive a securing screw and keep its head from contacting with the surface of the base, said boss being of less diameter than the head of a securing screw to coöperate with a bridle ring, and means on the base to coöperate with the bridle ring and prevent its unauthorized or accidental pivoting on the hollow boss.

3. A conduit or cable clamp provided with a hook portion and a base having a hollow boss struck up from the base, the opening in the boss adapted to receive a securing screw and keep its head from contacting with the surface of the base, said boss being of less diameter than the head of a securing screw to coöperate with a bridle ring, and lugs or tits on the base to coöperate with the bridle ring and prevent its unauthorized or accidental pivoting on the hollow boss.

4. A conduit or cable clamp provided with a hook portion and a base having a hollow boss struck up from the base, the opening in the boss adapted to receive a securing screw and keep its head from contacting with the surface of the base, said boss being of less diameter than the head of a securing screw to coöperate with a bridle ring, and means on the base to hold the shank of a bridle ring under spring tension to prevent the bridle ring moving with relation to the conduit or cable clamp.

5. A conduit or cable clamp provided with a hook portion and a base having a hollow boss struck up from the base, the opening in the boss adapted to receive a securing screw and keep its head from contacting with the surface of the base, said boss being of less diameter than the head of a securing screw to coöperate with a bridle ring, and lugs or tits on the base to hold the shank of a bridle ring under spring tension to prevent the bridle ring moving with relation to the conduit or cable clamp.

HENRY W. PLEISTER.

Witnesses:
M. R. RYAN,
A. M. WILLIAMS.